(12) United States Patent
Hoganson

(10) Patent No.: US 11,121,561 B2
(45) Date of Patent: Sep. 14, 2021

(54) UTILITY POLE BATTERY STORAGE SYSTEM

(71) Applicant: Comptek Technologies, LLC, Boulder, CO (US)

(72) Inventor: Kenneth Michael Hoganson, Aurora, CO (US)

(73) Assignee: Comptek Technologies, LLC, Boulder, CO (US)

( * ) Notice: Subject to any disclaimer, the term of this patent is extended or adjusted under 35 U.S.C. 154(b) by 0 days.

(21) Appl. No.: 16/540,687

(22) Filed: Aug. 14, 2019

(65) Prior Publication Data
US 2020/0059105 A1 Feb. 20, 2020

Related U.S. Application Data

(60) Provisional application No. 62/718,652, filed on Aug. 14, 2018.

(51) Int. Cl.
| | |
|---|---|
| *H02J 7/00* | (2006.01) |
| *H01M 2/10* | (2006.01) |
| *H01M 10/46* | (2006.01) |
| *H01M 50/20* | (2021.01) |

(52) U.S. Cl.
CPC .......... *H02J 7/0013* (2013.01); *H01M 10/46* (2013.01); *H01M 50/20* (2021.01); *H02J 7/0045* (2013.01); *H01M 2220/10* (2013.01)

(58) Field of Classification Search
CPC ............... H01M 10/46; H01M 2/1077; H01M 2220/10; H02J 7/0013; H02J 7/0045; H02J 9/065; Y02E 60/10

USPC ............................................................. 307/19
See application file for complete search history.

(56) References Cited

U.S. PATENT DOCUMENTS

| | | | |
|---|---|---|---|
| 5,266,738 A | 11/1993 | Macvoy | |
| 5,963,178 A | 10/1999 | Jones | |
| 6,222,503 B1 | 4/2001 | Gietema et al. | |
| 6,769,509 B2 | 8/2004 | Harwood | |
| 7,731,383 B2 | 6/2010 | Myer | |
| 9,837,698 B2 | 12/2017 | Lasier et al. | |
| 10,247,406 B2 | 4/2019 | Abbott et al. | |
| 2010/0231469 A1* | 9/2010 | Kim | H01Q 1/44 343/721 |
| 2013/0154570 A1* | 6/2013 | Nomura | H02J 7/35 320/128 |
| 2015/0349399 A1 | 12/2015 | Lasier et al. | |
| 2016/0018074 A1* | 1/2016 | Diamond | F21V 23/0464 362/183 |

FOREIGN PATENT DOCUMENTS

GB 2354634 * 3/2001

* cited by examiner

*Primary Examiner* — Toan T Vu
(74) *Attorney, Agent, or Firm* — Russell Manning; FisherBroyles, LLP (57) ABSTRACT

The present disclosure is directed to utility poles that house a vertical stack of batteries to store energy. The utility pole in one configuration is a small cell pole. In one arrangement, the small cell pole stores sufficient energy to operate for several day during a power failure. In a further arrangement, a plurality of battery storage poles operate as a source and/or sink for a local electricity grid to balance the operation of the grid.

12 Claims, 6 Drawing Sheets

UTILITY POLE BATTERY STORAGE SYSTEM

CROSS REFERENCE

The present application claims the benefit of U.S. Provisional Application No. 62/718,652 having a filing date of Aug. 14, 2018, the entire contents of which is incorporated herein by reference.

FIELD

The present disclosure is directed to utility poles such as light poles, power poles and small cell poles. More specifically, the present disclosure is directed to a utility pole that houses a vertical stack of rechargeable batteries. A system of such utility poles may be utilized to augment a local electricity grid and/or temporarily replace the local electricity grid.

BACKGROUND

In many urban settings, public or quasi-public infrastructure is located in the right-of-way of public roads. For instance, utility poles such as street lights and power poles are often located in the right-of-way of roads and/or highways. For example, such utility poles are often positioned on or at the edge of pedestrian sidewalks.

In addition to street lights and power poles, small cell poles are increasingly being located at street level (e.g., in the public right-of-way). That is, with the increasing use of mobile data, a trend has been toward increasing the density of cell poles in urban environments. By way of example, proposed 5G wireless networks promise greatly improved network speeds and are currently being planned and implemented. However, such networks require shorter RF transmission distances compared to existing networks and require more dense networks of access points/small cell poles to handle data traffic. In various municipalities, small cell poles having configurations that support both cell equipment and street lights are replacing existing street lights. This allows dual use of the utility pole location. Stated otherwise, additional infrastructure is provided without increasing the density of the infrastructure.

SUMMARY

Various aspects of the present disclosure are based on the realization that significant infrastructure exists that could be upgraded for additional uses. For instance, various utility poles currently exist within public right-of-ways (as well as other locations) that could be upgraded for additional uses. By way of example, an urban city block of approximately 330 feet by 330 feet may contain approximately sixteen streetlights. Such streetlights are typically included within the right-of-way and are typically connected to the electricity grid. These existing light poles (or other utility poles) provide existing locations that may be better utilized. For instance, such existing utility poles may be replaced with utility poles that incorporate power storage. In the case of a city block having 16 streetlights, if each pole stored 50 kWh of energy, the power storage pole system could store 800 kWh of energy without increasing the amount of infrastructure/poles in the local environment (e.g., on a sidewalk), where space may be at a premium. Such an amount of energy may be utilized in various ways.

In one arrangement, the present disclosure is directed to the use of the interior portions of utility poles to house batteries/battery packs. Typically, the utility poles will house a plurality of batteries in a vertical stack that having a height that is greater than width and/or depth (e.g., diameter) the pole. In such an arrangement, a utility pole may be termed a 'battery storage pole'. The number of the stacked batteries (e.g., battery packs) may be varied depending on the height of the pole. In an arrangement, each battery storage pole may be connected to a local electric grid for recharging. In another arrangement, each battery storage pole may be connected to a source of renewable power (e.g. photovoltaic panels) for recharging. In any arrangement, the battery storage poles may permit operation of the pole when, for example, grid power is absent. For example, when the battery storage pole is a small cell pole, the batteries disposed within the pole may allow for several hours or even days of continued operation of cell equipment maintained within the pole. In such an instance, infrastructure may continue to operate during a grid blackout or other diversion of grid power.

In a further arrangement, a plurality of battery storage poles may collectively define a battery storage system. That is, the plurality of battery storage poles may be electrically connected for use as a common storage system. In one arrangement, the battery storage system may be charged by a local electric grid and discharged when needed. In the latter regard, the battery storage system defined by the utility poles may controllably discharge to smooth or level the loads on the local grid. For instance, during periods of peak demand, the battery storage system may discharge to reduce the load (e.g., inductive load) on the grid. Conversely, during times of low grid usage, the battery storage system may charge the batteries of the individual storage poles. Stated otherwise, the battery storage system may provide a source or a sink to balance the load of the grid.

In an arrangement, the battery storage poles may form a micro-grid. Such a micro-grid may be selectively connectable to an electrical grid (e.g., utility grid) for charging. However, the micro-grid may be disconnected from the grid such that the micro-grid may operate when grid power is not available.

The ability to store electrical power utilizing space that was previously occupied by other infrastructure allows storage of significant energy resources proximate to commercial and/or residential users while providing a minimal foot print in the environment. In an arrangement, the battery storage poles may be utilized to charge electric vehicles. This is especially convenient when the battery storage poles are located along streets where parking is available. In such an arrangement, the battery storage pole may charge during demand hours and provide energy during high demand hours without increasing usage of the grid. Further, an owner of the battery storage pole may profit from purchasing energy during low demand hours and selling the energy during high demand hours. Along these lines, the battery storage pole may be metered and/or include various user interfaces to, for example, accept payment.

In an arrangement, the battery storage poles are small cell poles that may be configured for use in urban environments. In various implementations, the small cell poles have configurations similar to existing utility poles (e.g., street lights), which minimizes their aesthetic obtrusiveness. The small cell poles, in addition to battery storage, include cell equipment. To reduce the size (e.g., diameter or other cross-section) of the poles, implementations utilize batteries that are vertically stacked, which permits the pole to maintain a small cross-dimension or width while providing significant storage.

In an arrangement, the batteries (e.g., battery packs) of the utility poles are generally annular having an open interior that provides a passage for wiring through the interior of the pole. In an arrangement, an inner duct passes through the interiors of the stacked batteries. In a further embodiment, an exterior sleeve surrounds the batteries. The inner duct and exterior sleeve may seal the batteries within a section of the pole. Temperature management systems may be provided for the batteries. In one arrangement, a fire suppression system may be provided.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

The present disclosure is directed to battery storage poles that are, in an embodiment, configured for use in urban environments. In various embodiments, the battery storage poles are small cell poles that may, but need not, incorporate light masts. Various embodiments of the presented inventions are related to the recognition by the inventors that existing utility poles provide a location that may conveniently store significant amounts of energy within, for example, an urban environment without increasing the amount of infrastructure within that environment. By way of example, most streets already have several light poles and/or power poles in their right-of-ways. Accordingly, by replacing an existing pole with a battery storage pole, energy may be stored in an area without increasing the number of infrastructure elements in or on the right-of-way of a street.

Figure 1:
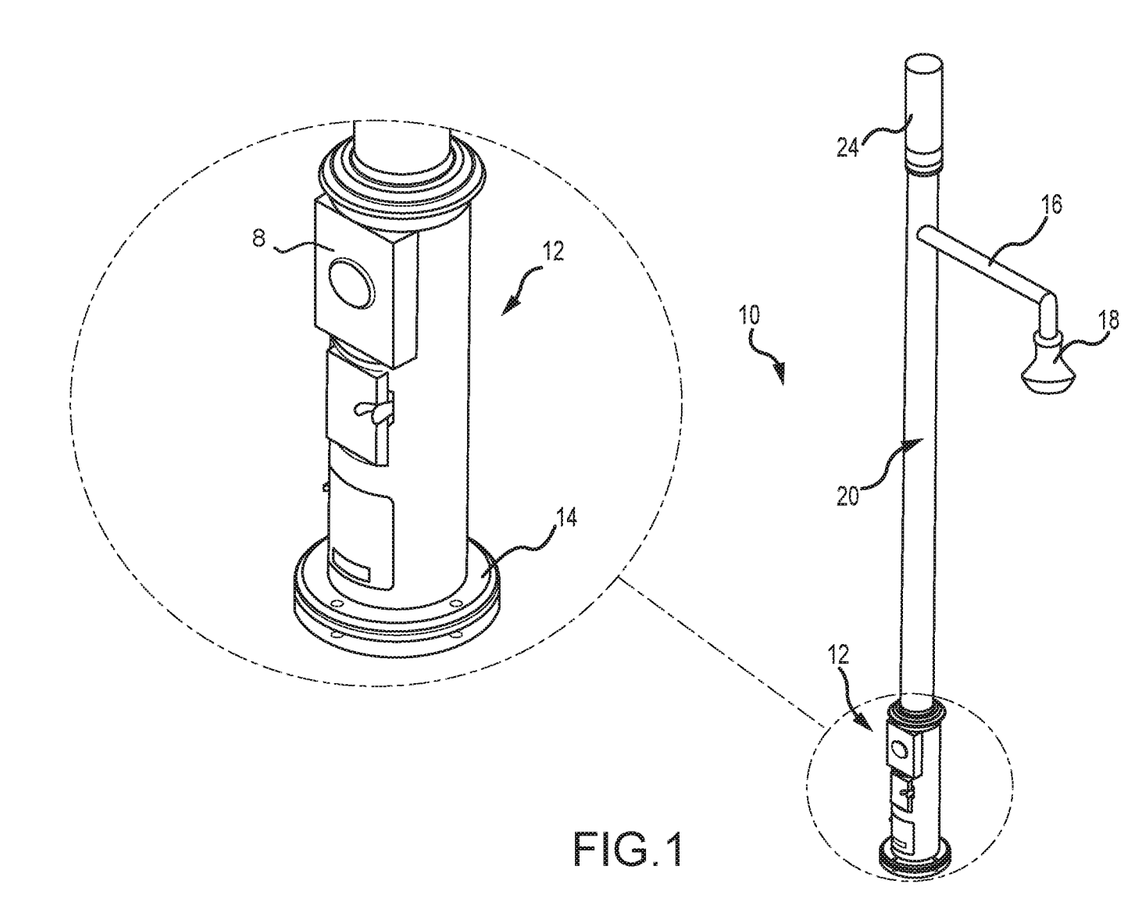
FIG. 1 illustrates one embodiment of a small cell pole and street light.

FIG. 1 illustrates one embodiment of a small cell pole 10 that may be utilized to house a plurality of storage batteries. Various features of this small cell pole are disclosed in co-owned U.S. Patent Publication No. 2017/0279187, entire contents of which is incorporated herein by reference. As shown, the cell pole includes a lower equipment housing 12 that includes an inner cavity (e.g., interior) configured to house cell control equipment. The equipment housing 12 has a lower flange 14 used to mount the housing to a surface (e.g., ground). Typically, utility power and/or communications (e.g., fiber optic cables) are routed through the base of the equipment housing. Other installation methods are possible (e.g., above and in-ground vault). Access panels and/or doors may be mounted to the equipment housing 12 to enclose equipment (e.g., electric meter 8) from the elements, while providing selective access, when desired, to modify, regulate, change out, or otherwise access the equipment. The housing may include locks, hinges, access doors, vents for passive radiant cooling, and/or viewing ports. Cable ports and other features may be formed therein during manufacture.

Fasteners, such as threaded posts or bolts, are formed on an upper surface (e.g., flange; not shown) of the equipment housing 12 to facilitate attachment of a pole 20, which may support one or more antenna structures 24. As shown, the cell pole 10 has a two-part design: the lower equipment housing 12 and the pole 20. The two-part construction allows for easier construction and implementation during set-up. That is, the equipment housing 12 can be installed separately from the pole 20 and/or antenna structure 24. Additionally, any equipment contained in the equipment housing may be installed at a later time. The present embodiment also illustrates a light mast or arm 16 attached to an upper portion of the pole 20. The illustrated light mast 16 supports a street light 18.

As set forth in U.S. Patent Publication No. 2017/0279187, the interior of the equipment housing 12 may open into the generally hollow interior of the pole 20. This allows passage of cables from the equipment housing(s) into the center of the pole to one or more antennas and/or lights etc.

Figure 2:
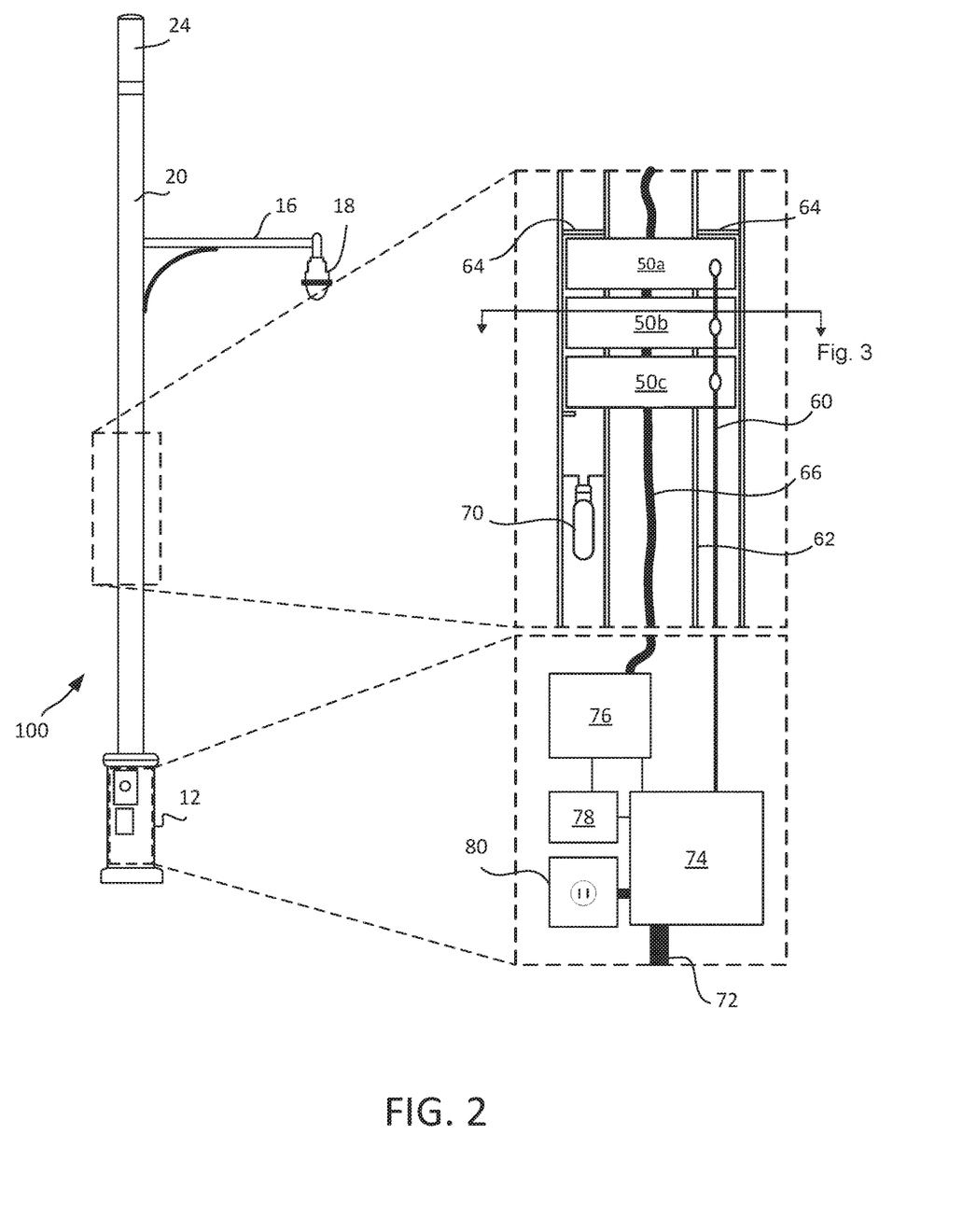
FIG. 2 illustrates one embodiment of a battery storage pole having vertically stacked battery storage.

As noted above, the inventors have recognized that the space within the interior of such a pole may, in some instances, be utilized to house one or more batteries. That is, the inventors have recognized that the interior space of the pole is currently not fully utilized and provides a space that could be put to beneficial use storing energy. FIG. 2 illustrates one embodiment of a battery storage cell pole 100 that houses a plurality of vertically stacked power packs/battery packs 50a-50nn (hereafter 50 unless specifically referenced) disposed within the spatial envelope of the pole 20.

Figure 3:
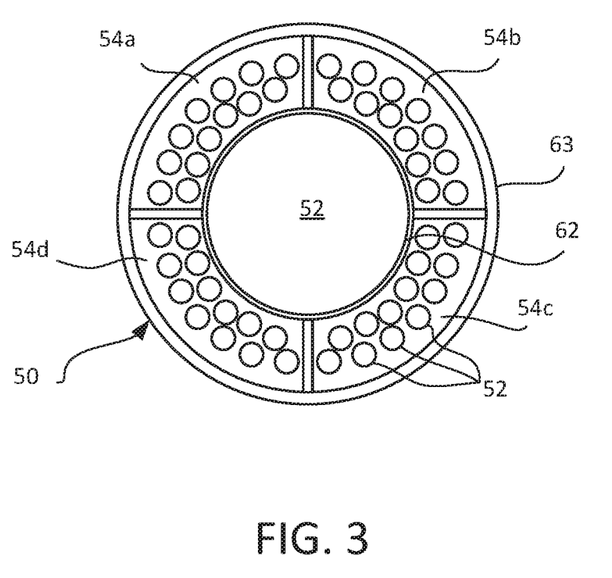
FIG. 3 illustrates a cross-section of an exemplary battery pack.

As shown in the cross-sectional view of FIG. 3, each battery pack 50 is, in an embodiment, a generally annular element. In this embodiment, the annular configuration of the battery pack 50 permits cabling 66 (see, e.g., FIG. 2) or wiring to pass through the central aperture 52 when the battery packs are assembled in the pole 20. Accordingly, when the utility pole incorporating the battery packs is a cell pole, cabling from the cabinet may pass through the pole 20 and the battery packs 50 to the antenna 24. Likewise, electrical cabling may pass through the pole and battery packs to the light mast 16 and light 18.

In the present embodiment, each battery pack is formed of four modules 54a-54d (hereafter 54 unless specifically referenced). Each module houses a plurality of individual cells 56. In one embodiment, the modules 54 each house thirteen (13) lithium-ion (Li-ion) cells 56. In a specific embodiment, the cells 56 are 18650 Li-ion rechargeable cells, typically 3.6-3.7 volts. In the present embodiment, cells of each module are disposed in series to produce a 48 VDC module. The four modules may be disposed in parallel as well as connected to adjacent battery packs. As illustrated in FIG. 2, the system incorporates three stacked battery packs 50a-50c. However, it will be appreciated that multiple additional battery packs may be disposed within the pole. That is, an energy storage section along the length of the pole may be varied. Taller poles may include more battery packs as more space is available. By way of example only, when utilizing the 18650 Li-ion batteries, a 48 VDC system having four modules per battery pack may have a diameter of 10 inches and a height of approximately 3-4 inches. Accordingly, each linear foot of height of the pole used as energy storage section may house three battery packs. Accordingly, a single battery pack utility pole may store significant amounts of energy if most of the pole is utilized to house the vertically stacked batteries. In one embodiment, such a pole may store 50 kWh of energy. However, it will be appreciated that the batteries, cells, sizes and capacities are provided herein by way of example and not by way of limitation. Other configurations are possible and within the scope of the presented disclosure.

As shown in FIG. 2, the separate battery packs 50 are connected by power and data connectors 60. Such connection may be achieved in any appropriate manner. For instance, each module may have surface contacts that connect to surface contacts of adjacent battery packs. Other connections are possible. In any embodiment, the power connector 60 is attached to a power source 72, which may enter the bottom of the cabinet 12. In one embodiment, the power source is AC power from the local electric grid. As will be appreciated, when the battery storage utility pole replaces an existing light pole or street light, power is already provided to the street light from the local electric grid. Accordingly, this power source may be utilized to charge the battery packs within the pole 100. If available, renewable energy may form the power source for the battery storage pole. In any arrangement, the battery storage pole may further include a charge controller(s) 74 to manage charging and/or discharging of the battery packs 50. For instance, such charge controller may include a rectifier to convert AC grid energy to DC energy for use in charging the battery packs. Likewise, the charge controller may include an inverter for converting DC energy from the batteries to AC energy having appropriate voltage amperage and phase, which may be fed back into the electrical grid or otherwise utilized. In various arrangements, the charge controllers may include various processors, data storage devices and/or communication protocols. Along these lines, the battery storage poles may be controlled remotely and/or report to a centralized controller. In an embodiment where the pole 100 is also a small cell pole, the cabinet 12 may additionally house cell control equipment 76, which may be attached to the antenna 24 via cabling 66 passing through the interior of the pole via the central apertures of the battery packs 50. Further, the cabinet 12 may include a controller 78, which may control operation of the pole 100. Yet further, the cabinet may house an electrical connector 80 allowing electrical energy from the pole to be used to, for example, recharge electric vehicles.

The battery storage section may include additional componentry. As previously noted, the battery packs 50 are annular elements. In an embodiment, an inner duct 62 passes through the interior annulus 52 of the battery packs. This inner duct 62 may be a solid element (e.g., steel). Additionally, an outer casing 63 or the pole 20 may form a casing about the outer periphery of the annular battery packs. In an embodiment, one or more fire stops 64 extend between an outside surface of the inner duct 62 and an inside surface of the outer casing 63 or pole 20 isolating the batteries within a section of the pole. That is, the space between an outside surface of the inner duct 62 and the inside surface of the casing 63 or pole 62 may define an annulus. The fire stops may be annular elements disposed in the annulus to isolate the batteries therein in what may be termed a containment duct. In an embodiment, the containment duct may include one or more vents to allow for passage of cooling air through the vertically stacked battery packs. In a further arrangement, active fire suppression may be provided within the containment duct by a fire suppression system 70. By way of example, a clean agent fire safety system may disperse an inert gas or halocarbon gases, etc. to suppress a fire. Other fire suppression systems are possible and within the scope of the presented disclosure.

In addition to cell equipment and streetlights, it will be appreciated that the battery storage utility pole may be utilized for different purposes and/or incorporate other electrically powered sensors and devices. By way of example, the battery storage pole may form a traffic light pole supporting traffic lights, cameras and cross walk sensors to name a few potential powered devices. In any configuration (e.g., small cell/light pole, traffic light, power pole etc.), the battery storage pole may be operative to self-power its supported components in the event of loss of primary power (e.g., grid power). By way of example, a small cell pole having 50 kWh of storage could continue normal operation for several days during a power outage. Other battery storage poles supporting other functions may also continue to operate during outages.

Figure 4:
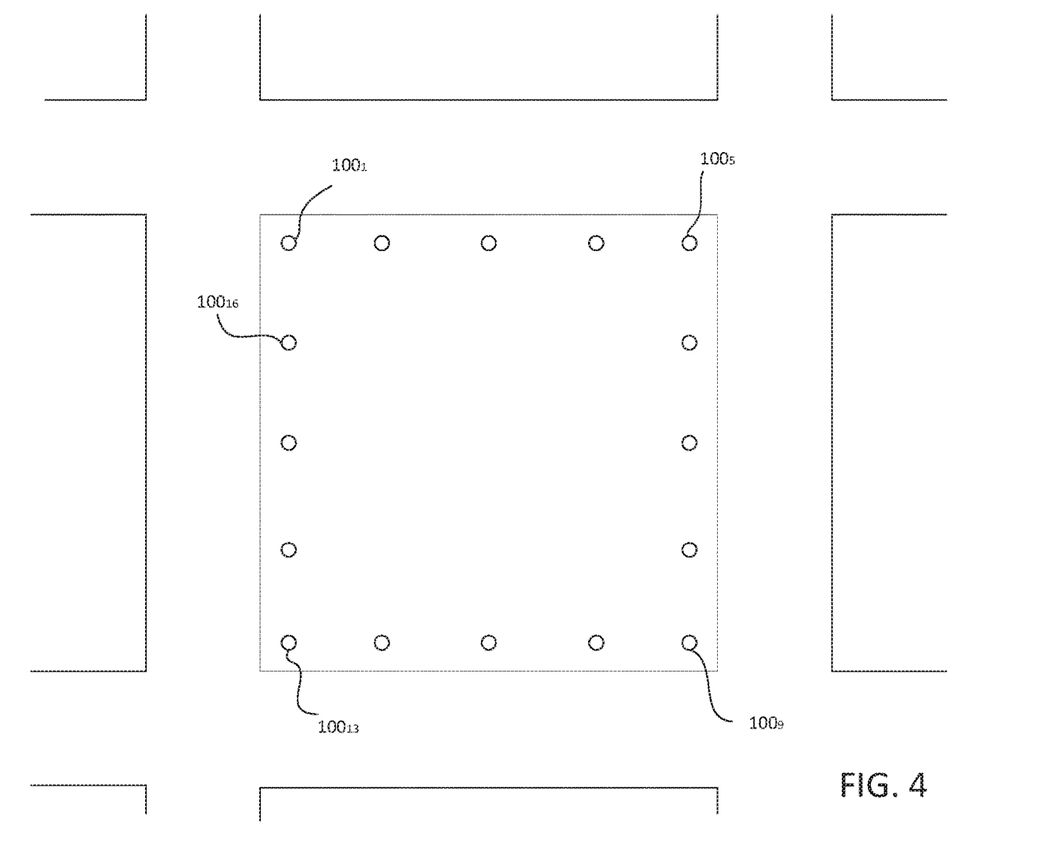
FIG. 4 illustrates a plurality of battery storage poles forming a battery storage system.

FIG. 4 illustrates an embodiment of the present disclosure where a plurality of battery storage poles 1001-10016 (hereafter 100 unless specifically referenced) are utilized together to form the battery storage system. In the illustrated embodiment, sixteen battery storage poles 100 are disposed on a single city block 300. Depending on the height of the battery storage poles 100, combined storage of these poles could vary between 750 and 1000 kWh. That is, a megawatt hour of power may be available per block for augmenting the local power grid. In an embodiment, one or more such battery storage systems may be configured into a micro-grid. In such an arrangement, the grid may be connectable to and dis-connectable from the battery storage system. In this arrangement, local loads may rely on power from the micro-grid (i.e., from by the battery storage systems), when utility power is not available. By way of example, a region of a town or city may be supported by a power substation connected to the grid. In such an arrangement, the battery storage system may likewise be connected to the power substation such that if there is a grid power failure, the battery storage system may provide power to the substation and maintain the region with backup power.

Figure 5:
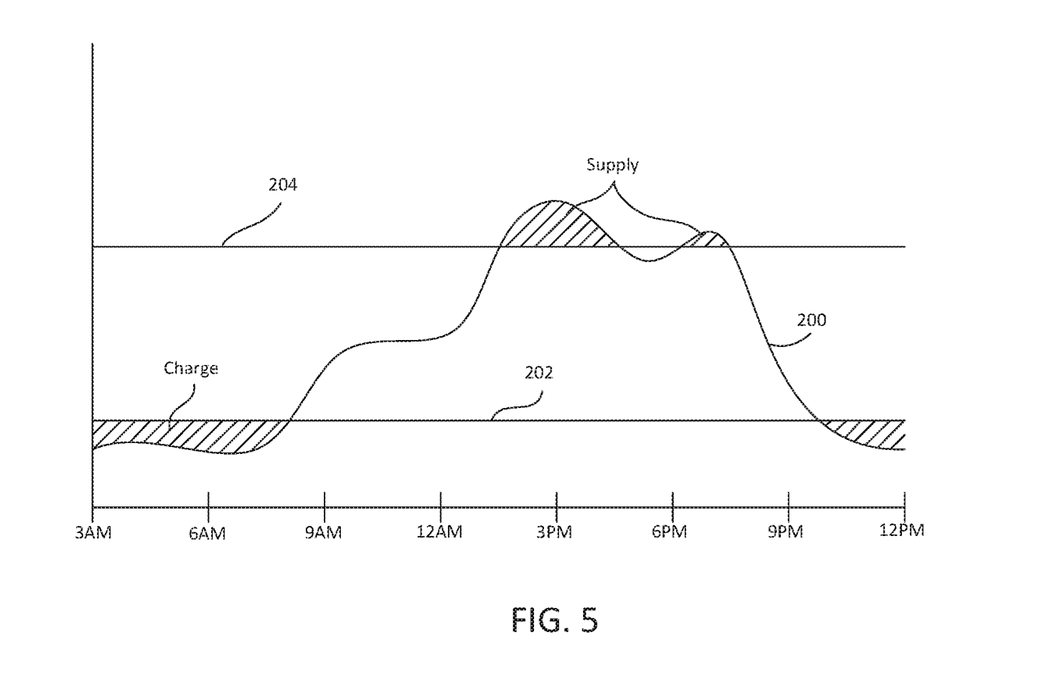
FIG. 5 illustrates usage of the battery storage system to balance the load of a regional utility grid.

In a further arrangement, the battery storage system may be utilized dynamically in conjunction with the power grid. By way of example, one or more battery storage systems may be utilized to balance the load (e.g., inductive load) of the local or regional power grid. FIG. 5 is a diagram that illustrates an exemplary inductive load of a regional portion of an electric power grid. This diagram is exemplary and is in no way limiting. As shown, by the regional load curve 200, in the early morning hours and late evening hours, the load demand of the regional electrical gird is typically low. During the working hours and especially in the afternoons (e.g., in areas with air conditioning needs) the load demand increases. When installed, the battery storage system described above may be utilized to balance or smooth (i.e., reduce) the peak demand on the grid. As shown in the diagram, during the period of low demand where usage is below a lower threshold 202, the battery storage poles 100 may store electrical energy in their batteries. As a result, the power demand of the grid may be increased during periods of low usage. During the periods of high demand above an upper threshold 204, the battery storage poles may provide electrical energy stored in their batteries to the regional grid to limit power demand on the power grid to the upper threshold 204. Effectively, such a system may allow, among other uses, acting as a source or a sink for the regional grid to reduce power fluctuations which may prevent a utility from having to start-up additional generating units or purchase available power from third parties. Along these lines, it will be appreciated that power to charge the battery storage poles may be purchased at off-peak times and rates and provided back to the grid or consumers at peak times and peak rates.

Figure 6:
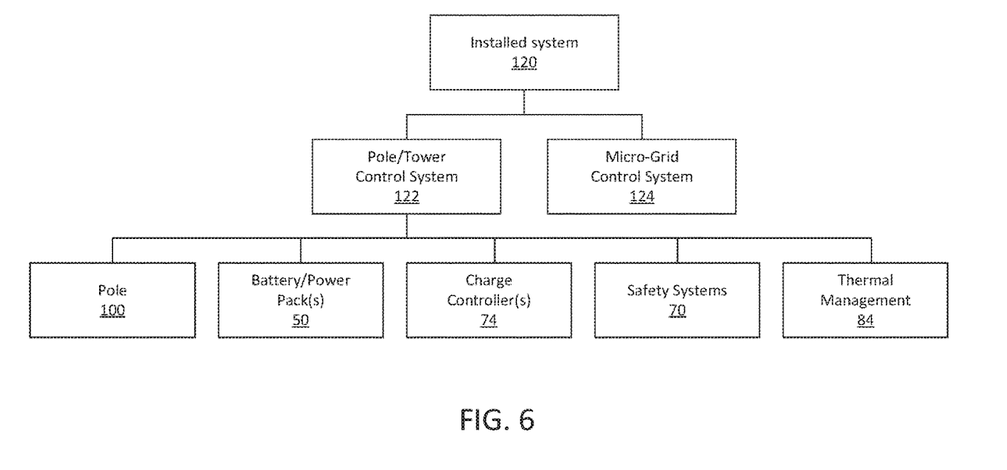
FIG. 6 illustrates a system incorporating one or more battery storage poles.

FIG. 6 illustrates one embodiment of an overall system 120 incorporating one or more battery storage poles 100. From the public's perspective, they simply see an installed electrical system, which may include one or more cell towers and or/other infrastructure elements. The system is controlled utilizing a micro-grid control system 124 and/or a tower/pole control system 122. The pole control system 122 coordinates operation of various elements of the pole 100 and may be disposed within the pole itself. The pole 100 houses the power system/battery packs 50, the charge controller 74, safety system(s) 70 and thermal management systems 84. The power pack is interconnected to the control system and provides physical protection and connectivity amongst the various cells while also providing power at correct amperages and voltages. One or more charge controllers manage the power pack and individual cells "state of charge" assuring power is available when needed as well as permitting charging the various cells when power is available. One or more safety systems may be incorporated into the tower system. Such safety systems include active and passive system components such as fire suppression as well as electrical disconnect. The tower system may further include thermal management which may be active and/or passive manage the temperature of the pole and its internal components.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A battery storage pole system comprising:
   a base connectable to ground surface, the base connectable to a power source;
   a pole extending from the base and having a hollow interior;
   a containment duct disposed within the hollow interior of the pole;
   a plurality of batteries disposed within the containment duct, wherein the batteries are vertically stacked within the interior to a height that is greater than a diameter of the pole;
   a fire suppression system fluidly attached to an interior of the containment duct; and
   a charge controller configured to charge said batteries using said power source.

2. The system of claim 1, wherein the charge controller is further configured to discharge the batteries.

3. The system of claim 2, wherein the charge controller comprises at least one of:
   an inverter; and
   a rectifier.

4. The system of claim 2, wherein the power source is an electrical grid and wherein the controller discharges the batteries to the electrical grid.

5. The system of claim 2, wherein the plurality of batteries comprise:
   a plurality of battery packs disposed in a vertical stack.

6. The system of claim 5, wherein each battery pack comprises:
   an annular battery pack having an open interior.

7. The system of claim 6, further comprising:
   cabling passing from a lower portion of the pole through the open interior of each annular battery pack and connecting to electrical componentry supported by the pole.

8. The system of claim 6, wherein the containment duct further comprises:
   an annular duct passing through the open interior of each annular battery pack; and
   an outer casing disposed around the exterior of each annular battery pack, wherein the battery packs are contained between the annular duct and outer casing.

9. The system of claim 2, wherein the controller discharges the batteries to the electrical componentry supported by the pole to operate the electrical componentry.

10. The system of claim 9, wherein the electrical componentry comprises at least one antenna supported by the pole.

11. The system of claim 1, wherein the fire suppression system comprises:
    a source of inert gas fluidly connected to the interior of the containment duct.

12. The system of claim 1, further comprising:
    an electrical connector accessible on an outer surface of the pole, wherein the charge controller is configured to discharge the batteries to the electrical connector.

\* \* \* \* \*